Patented Mar. 18, 1941

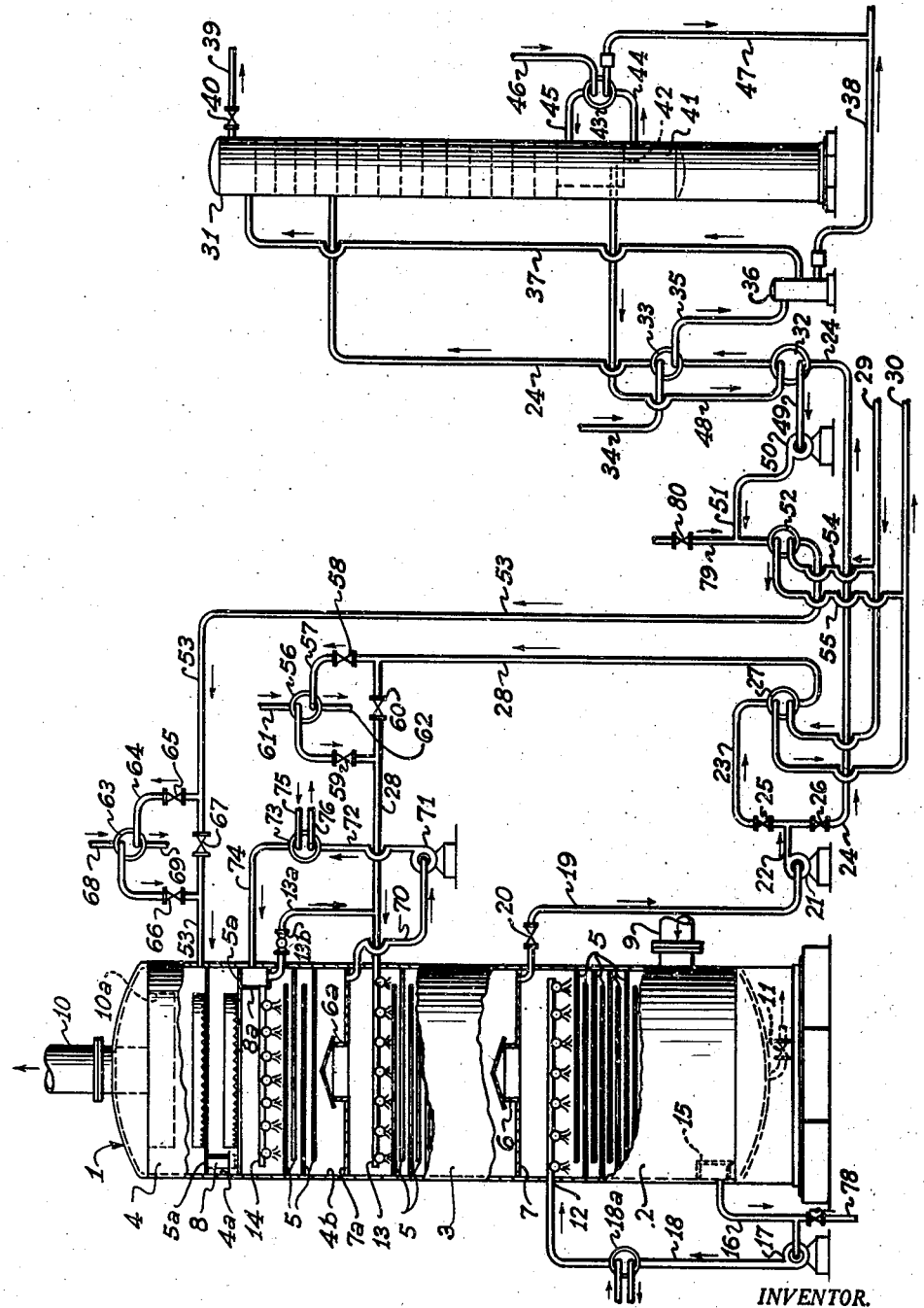

2,235,322

UNITED STATES PATENT OFFICE 2,235,322

AIR DRYING

Henry Arthur Martin, Kansas City, Mo., assignor to J. F. Pritchard & Company, Kansas City, Mo., a corporation of Missouri Application January 29, 1940, Serial No. 316,179

7 Claims. (Cl. 183—120)

This invention relates to processes and apparatus for dehydrating and conditioning gas, such, for example, as air, coke oven gas, coal gas, and the like.

A principal object of this invention is to provide a process for dehydrating gas wherein the dew-point of the gas may be reduced materially below the temperature of the gas.

Another object is to provide a process for dehydrating gas wherein the dew-point of the gas may be materially lowered without reducing the temperature of the gas to a corresponding degree.

A further object is to provide a novel multi-stage process for dehydrating gas wherein dehydration and dew-point depression takes place in a plurality of stages by contact with a dehydrating solution of a different concentration in each stage.

Still another object is the provision of a multi-stage process for dehydration of gas by the employment of a dehydrating agent in solutions of different concentrations in each of the stages and wherein the used solutions are restored to their respective original concentrations by reconcentration of only a minor portion of the combined solutions.

A general object of this invention is to provide a process for dehydrating gas employing a liquid dehydrating agent whereby the size and cost of equipment for reconcentrating the dehydrating agent and the expense of operations are materially reduced in relation to more conventional practice.

Still another object is to provide apparatus suitable for practicing the process of this invention.

In accordance with the present invention, gas is treated in two principal treating stages to effect the desired degree of dehydration and dew-point depression and control of final temperature thereof. These two principal stages may be preceded by a preliminary washing or scrubbing stage, particularly for the purpose of removing dust and other mechanical impurities from the gas, and, in some cases to effect a preliminary cooling of the gas. Air entering the first of the principal treating stages is there intimately contacted with a comparatively large volume of a relatively dilute solution of a suitable dehydrating agent. This stage of treatment has two principal objectives: One, to remove the heat of compression or any other heat in the gas stream so that its final temperature can be carefully controlled; and two, to partially dry the air so that the next stage will function without undue heating of the dehydrating solution due to the heat of absorption of the water vapor from the gas.

The gas then goes to the second and final treating stage, where it is intimately contacted with a comparatively smaller volume of a relatively highly concentrated solution of the same dehydrating agent employed in the first treating stage. Final dehydration and control of temperature of the treated gas is effected in this stage.

These two principal treating stages are connected in series, so that the gas passes counter-current to the treating solutions in the successive stages, and the treating solution leaving the final stage flows into counter-current contact with the gas in the first treating stage and mixes with the treating solution in that stage. The resulting commingled solution is then withdrawn from the first stage and a relatively minor portion is diverted from the main stream and reconcentrated to that concentration required in the final treating stage to which it is then recycled. The remaining major portion of the commingled solution is recycled directly to the first treating stage without additional treatment. The volume and rate of diversion of the minor portion is regulated to such that its reconcentration will serve to remove moisture from the system at substantially the same rate at which it is absorbed from the gas in the treating stages. In this way maximum efficiency in dehydration and dew-point depression, along with temperature control of the treated gas, is accomplished with a minimum amount of re-concentration equipment and at great savings in cost of such equipment and of the utilities necessary for its operation.

Generally, by the process of this invention, it is only necessary to bleed-off about 20 per cent or less of the commingled treating solution for reconcentration, and the volume of highly concentrated solution employed in the final treating stage is about one-fifth of the volume of relatively dilute solution employed in the first treating stage.

The dehydrating agent which has been found to be of use in the process of this invention is triethylene-glycol in relatively dilute and concentrated solutions in water for the several stages of treatment. However, many other dehydrating agents may be employed with varying degrees of efficiency, and this invention is not necessarily limited to the use of triethylene-glycol. Other dehydrating agents which may be used include diethylene-glycol, glycerine, and various brines formed from hygroscopic substances such as calcium chloride, lithium chloride, and the like.

Where a preliminary washing or scrubbing stage is used preceding the principal treating stages, water or oil, or a dilute solution of one of the above mentioned dehydrating agents may be employed for the removal of dust, or other mechanical impurities from the air, and for partial cooling of the gas, where such treatment is advisable or desirable.

The invention will now be described in detail in connection with the accompanying drawing, in which the single figure is a partially diagrammatic view of the apparatus employed in practicing the process of this invention.

Referring to the drawing, a contact tower 1 comprises a scrubber section 2 in the lower portion of the tower, a primary treating section 3 located in an intermediate portion of the tower and a final treating section 4 located in the upper portion of the tower. Each of the tower sections 2 and 3 is filled with vapor-liquid contacting devices such as baffle trays 5. Various other well-known forms of contacting devices may be used successfully, such as bubble trays, wooden hurles, packing rings, and the like. Final treating section 4 is partitioned into upper and lower portions 4a and 4b, respectively. Upper portion 4a contains bubble trays 5a, the lowermost one of which provides the partition between the two portions of this section. Portion 4b is filled with baffle plates 5 similar in construction to those in the other sections of the tower. Scrubber section 2 is connected to primary treating section 3 by means of a duct 6, which passes through a plate 7 which partitions scrubbing section 2 from the remainder of the tower. A plate 7a provided with a duct 6a partitions primary section 3 from final treating section 4, the vapors from section 3 passing upwardly through duct 6a into portion 4b and thence through the usual vapor risers (not shown) in bubble plates 5a into and through upper portion 4a. Liquid communication between sections 3 and 4 is provided through downcomer 8 and a trap 8a which traps the liquid flowing from the lowermost one of the trays 5a. From trap 8a at least a portion of the overflow liquid is discharged through a pipe 13a, under control of a regulating valve 13b, into a pipe 28 leading to a group of sprays positioned in the upper portion of section 3 above the baffle plates therein. The tower has an inlet pipe 9 communicating with scrubber section 2, by means of which gas is admitted to the tower, and an outlet pipe 10 communicating with upper portion 4a of final treating section 4, through a mist extractor 10a of conventional construction, by means of which the finally treated gas is conducted to any suitable storage receptacle or to a point of consumption for the gas. The lower end of the tower is fitted with a valved pipe 11 through which scrubbing liquid and impurities accumulating in section 2 may be discharged from the system. A pipe 70 communicates with lower portion 4b of section 4 above plate 7a and connects to the suction of a pump 71 which has a discharge pipe 72 which connects to the shell of a conventional type of a shell-and-tube cooler 73 whence a discharge pipe 74 communicates with the interior of trap 8a. Pipes 75 and 76 provide inlet and outlet connections to the tubes of cooler 73 for circulation of a suitable cooling medium therethrough.

Each of the tower sections 2 and 3, and lower portion 4b is provided with a group of sprays 12, 13 and 14, respectively, located in the upper portions of the respective sections and adapted to discharge liquid downwardly over the baffle plates 5 of each section. Sprays 14 are connected to trap 8a which feeds liquid to this group of sprays as will be later described. Scrubber section 2 is provided with a weir 15 through which scrubbing liquid collecting in the lower portion of section 2 is withdrawn through a pipe 16 connecting to the suction of a pump 17 which discharges this liquid through a pipe 18 to sprays 12 for recirculation of this liquid through section 2. A cooler 18a such as a conventional shell and tube cooler, is interposed in pipe 18, whereby the liquid in passage through pipe 18 may be cooled by means of a suitable cooling medium circulated through the tubes of the cooler 18a. A valved pipe 78 is connected into pipe 16 for the introduction of suitable scrubbing liquid into scrubbing section 2 of the tower. A suction pipe 19, fitted with a valve 20, is connected to the lower portion of primary treating section 3 at a point just above plate 7, and leads to the suction of a pump 21, which has a discharge pipe 22 to which are connected branch pipes 23 and 24, fitted with valves 25 and 26, respectively. Branch pipe 23 is connected to the shell of a shell-and-tube type cooler 27, from which a pipe 28 leads to sprays 13. Pipes 29 and 30 provide inlet and outlet connections, respectively, for circulating cooling water from a suitable supply source, not shown, through the tubes of cooler 27.

Branch pipe 24 is connected into the upper portion of a reconcentrator column 31, which may be of any conventional design suitable for distilling and fractionating liquid introduced into the column through pipe 24. A conventional bubble plate column is illustrated in the drawing, pipe 24 entering column 31 beneath some of the uppermost trays. Liquid moving through pipe 24 to column 31 passes, en route, through the shells of heat exchangers 32 and 33, arranged in series. Heating fluid is admitted to the tubes of exchanger 33 through a pipe 34 and discharged therefrom through a pipe 35 which connects to the upper portion of an accumulator 36. A pipe 37 leads from an intermediate portion of accumulator 36 to the upper portion of column 31 above the point of entry of pipe 24 and preferably just above the uppermost tray in the column. A pipe 38, connected to the bottom of accumulator 36, leads to a suitable point of disposal for the fluid conducted thereby from the accumulator. A vapor discharge pipe 39, fitted with a valve 40, leads from the uppermost portion of column 31. The lower portion of column 31 is provided with the usual reboiler section 41 and a collector pan 42. A conventional reboiler 43 is connected in the usual way by means of pipes 44 and 45 to reboiler section 41, and heating fluid is admitted through a pipe 46, 47 which connects with pipe 38. A pipe 48 conducts liquid from collector pan 42 to the tubes of heat exchanger 32, from which a pipe 49 connects to the suction of a pump 50. A pipe 51 connects the discharge of pump 50 to the shell of a shell-and-tube cooler 52 from which a pipe 53 connects to section 4a of tower 1 above the uppermost bubble tray 5a. A branch pipe 54 conducts cooling water from pipe 29 to the tubes of cooler 52 from which the water returns through a branch pipe 55 to pipe 30.

A shell-and-tube type chiller 56 has its tubes connected in a by-pass pipe 57, which is connected to pipe 28. Valves 58 and 59 are arranged in the branches of by-pass pipe 57 and a valve 60 is positioned in pipe 28 between the branches of the by-pass, whereby all or any desired portion of the fluid passing through pipe 28 may be diverted through chiller 56. Inlet and outlet pipes 61 and 62, respectively, are connected to the shell of chiller 56 for the circulation of a suitable chilling liquid therethrough.

A chiller 63, similar to chiller 56, is similarly arranged in a by-pass 64 connected to pipe 53. By-pass 64 is fitted with branch valves 65 and 66 and pipe 53 with a valve 67 between the branches of the by-pass. Chilling fluid is admitted to the shell of chiller 64 through a pipe 68 and conducted therefrom through a pipe 69. A pipe 79, fitted with a valve 80, is connected into pipe 51 for introduction of treating material into the system.

The manner of employment of the above-described apparatus for the dehydration of air, will now be described. Air to be dehydrated is introduced through inlet pipe 9 into tower 1, entering through scrubbing section 2, and flows upwardly therethrough in intimate counter-current contact with the downwardly flowing scrubbing liquid such as oil or water, from sprays 12, which removes dust and other mechanical impurities from the air. The downflowing scrubbing liquid collects in the lower portion of section 2 and a portion thereof is continuously withdrawn by way of weir 15 through pipe 16 by pump 17 and returned through pipe 18 to sprays 12. A portion of the scrubbing liquid containing the impurities removed by the scrubbing, which collects in the bottom of section 2 of the tower, may be withdrawn therefrom, either continuously or intermittently, through pipe 11, as this liquid becomes contaminated. The withdrawn liquid is replaced in the system by fresh liquid introduced through pipe 78 into the suction of pump 17. Where some preliminary cooling of the air in the scrubbing stage is found desirable, the fluid returning to sprays through cooler 18a is cooled by water or other suitable cooling medium to remove heat picked up by the circulating scrubbing fluid from the gas.

The cleaned air from the scrubbing section of the tower next passes upwardly through duct 6 into primary treating section 3 of the tower, where it flows through baffle plates 5 in intimate counter-current contact with a relatively dilute water solution of triethylene-glycol, which serves to remove the major portion of any excess heat contained in the air, and to absorb at least a part of the moisture in the air. The solution of triethylene-glycol which contacts the air in section 3 consists of a mixture of a comparatively large volume of a relatively dilute solution introduced into the top of section 3 through sprays 13 and a smaller volume of relatively concentrated solution descending from final treating section 4. The total volume and concentration of the solution employed in section 3 is so regulated to at all times control the temperature of the air leaving this stage so as to require comparatively little cooling of the air in the final stage. Also, sufficient dehydration is effected in section 3 so that the quantity of water vapor remaining in the air going to the final treating stage will not produce such an amount of heat of absorption as to cause an undue increase in temperature of the solution in the final stage.

The air from section 3 then flows through both portions 4b and 4a of section 4 into intimate counter-current contact with a comparatively small volume of a highly concentrated solution of the treating agent introduced on top of bubble trays 5a from pipe 53. This final treating stage functions to control the final temperature of the air and to complete its dehydration to the desired dew point. The treated air, at the desired temperature and dew point is then discharged from tower 1 through outlet pipe 10, from which it goes to a suitable receiver, not shown, or sent directly to consuming equipment, such as blast furnaces or the like.

To provide the maximum cooling and dehydrating efficiency in section 4 of the tower, a portion of the concentrated dehydrating agent, which descends through trays 5a, of section 4a and is trapped in tray 8a, is discharged therefrom through sprays 14 over the baffles 5 in section 4b. This liquid then collects on top of plate 7a from which it is withdrawn through pipe 70 by pump 71, which pumps this liquid via pipe 72 through the cooler 73 and then returns the liquid into trap 8a, by way of pipe 74. The liquid thus being recirculated to trap 8a and sprays 14 is cooled in cooler 73 by water or other suitable cooling means. The remainder of the concentrated dehydrating solution which is caught in trap 8a flows by gravity through pipe 13a into pipe 28 where it mixes with the relatively dilute solution of dehydrating agent going to sprays 13. By suitable manipulation of valve 13b, the volumes of the portions of concentrated solution sent to sprays 13 and 14, respectively, are regulated so that the volume of solution passing through pipe 13a to sprays 13 is equal to that being introduced into the top of section 4a through pipe 53. Since this material is composed of a mixture of the solution flowing down through trays 5a and that recirculated through cooler 73, its temperature can be thus controlled to aid in maintaining the most efficient cooling and dehydrating temperature for the solution going to sprays 13 for use in primary treating section 3.

The commingled triethylene-glycol solutions collect in the lower portion of section 3 above plate 7 and are withdrawn therefrom through pipe 19 and valve 2 by pump 21 and discharged through pipe 22 into branch pipes 23 and 24. By suitable manipulation of valves 25 and 26 about 80 per cent or more of the volume of the commingled solutions is caused to flow through the shell of cooler 27, where this solution, which has become heated in treating the air, is cooled by means of cold water circulated through the tubes of the cooler by means of pipes 29 and 30. This cooled portion of the treating solution then returns through pipe 28 to sprays 13 for recirculation through treating section 3 for treatment of additional quantities of air.

The remaining 20 per cent or less of the used dehydrating solution flows through branch pipe 24 on to the feed plate of distilling column 31, where it is subjected to a more or less conventional distillation and fractionation treatment to remove excess water therefrom and bring it that relatively high concentration required in treating section 4 of tower 1. En route to column 31, the dilute solution passes first through the shell of heat exchanger 32 where it is partially heated by exchange with relatively hot concentrated solution leaving the lower portion of column 31 through pipe 48, and second through the shell of heat exchanger 33 where it is heated to its final flashing temperature by heat exchange with steam admitted to the tubes of the exchanger through pipe 34. In heating the dilute dehydrating solution to flashing temperature, the steam is condensed and the resulting condensate flows through pipe 35 into accumulator 36, whence at least a part of this condensate is sent through pipe 37 to the upper portion of column 31 to serve as reflux to prevent the escape of any of the dehydrating agent from the column. Any excess condensate is discharged from accumulator 36 through pipe 38 to a boiler feed tank or other suitable source of disposal. The column 31, together with reboiler 43 and the attendant connections and equipment, function in the normal manner to strip out of the dilute treating solution such quantity of water as necessary to bring the solution to the desired concentration. As previously noted, the concentrated solution collects in the lower portion of column 31, in collector pans 42, and is withdrawn therefrom through pipe 48, whence it passes through the tubes of heat exchanger 32, and thence through pipe 49 to the suction of pump 50. From pump 50 the concentrated solution passes through pipe 51, through the shell of cooler 52, where the solution is cooled to the final desired temperature by means of cold water circulated through the tubes of the cooler by means of branch pipe 54 and 55 connecting to pipes 29 and 30, respectively. From cooler 52, the cold concentrated dehydrating solution passes through pipe 53 to section 4a where it again contacts air flowing through the treating sections of tower 1. Vacuum distillation may be employed instead of atmospheric or pressure distillation to reconcentrate the glycol solution in column 31 in order to effect the re-concentration at lower temperatures and permit the use of the exhaust steam for heating. Such a modification is well known to those skilled in the art of distillation and need not be elaborated upon here.

Ordinarily, the volume of dilute dehydrating agent, which is circulated to sprays 13, is about five times that of the concentrated agent returned to top tray 5a in section 4 of the tower. The dilute solution contains about 84 to 86 percent, by weight, of triethylene-glycol, while the concentrated solution contains from 92 to 95 per cent by weight of triethylene-glycol. The concentrated dehydrating solution, of course, becomes somewhat diluted through absorption of water vapor remaining in the air which it contacts in the final treating section 4, but remains sufficiently concentrated when it mixes with the larger volume of dilute solution in the primary treating section, to maintain the concentration of the total solution contacting the air in section 3 at the desired concentration. Only as much of the mixed solution is continuously diverted to the reconcentrating equipment through branch pipe 24 as will be necessary to secure removal of water vapor in the reconcentrator at the same rate at which it is absorbed in the dehydrating system, and the resulting concentrated solution, then returned to treating section 4 will be of sufficient quantity to control the final temperature of the air and to effect the desired degree of dew-point depression. By this method maximum dew-point depression is obtained with a minimum amount of re-concentration equipment and at a minimum cost of utilities necessary to operate it.

As one specific example of the operation of the process of this invention, air entering the treating system at the substantially atmospheric temperature of 87° F. was washed with water in scrubbing section 1, and then contacted in primary treating section 3 with about 250 gallons per minute of an 86 per cent solution of triethylene-glycol and in final treating section 4 with about 50 gallons per minute of a 94 per cent triethylene-glycol solution. The air was discharged from tower 1 at about 87° F. and at a dew-point of about 30° F. Both solutions, before contacting the gas are cooled only slightly below atmospheric temperature by ordinary cooling water in coolers 27 and 52, and thus it will be evident that this process produces large dew-point depressions without the use of artificial refrigeration. Dew-point depressions as great as 60° F. or more may be obtained by this process without the use of artificial refrigeration.

Where it is desired to obtain still greater dew-point depression, one or both solutions may be refrigerated by by-passing all or part of each solution through the respective chillers 56 and 63 where the solutions are chilled to the desired temperatures by circulating suitable refrigerating agents through the tubes of the chillers. Even in such a case, this process produces the maximum degree of dew-point depression with a minimum amount of refrigeration and thus provides a most economical process for this purpose.

The dehydrating solution may be introduced into the system through pipe 79 and valve 80, when starting up the system or when it is desired to add make-up solution during operation of the process.

Where the gas undergoing treatment is a corrosive gas, various suitable inhibitors, well known in the art, may be added to the dehydrating agent to protect against corrosion. Where the dehydrating agent is of such a nature as to be subject to undesirable oxidation, oxidation inhibitors, many of which are well known, may also be added to the dehydrating solution. Where the gas contains acidic gases such as hydrogen sulfide, sulfur oxides, carbon dioxide, and the like, a purifying substance, suitable for removal of such impurities, may be added to the dehydrating solution, whereby the gas may be both dehydrated and purified in the same operation.

With regard to the preliminary scrubbing step conducted in scrubbing section 2 of the tower, as noted above, this step may be entirely dispensed with on occasion and is not essential to the process, although it is useful in many cases. Also the scrubbing step may be performed in a separate vessel and not in the same vessel in which the dehydrating steps are performed.

The process may be practiced under a wide range of pressures, varying from sub-atmospheric, where the gas to be treated is drawn through tower 1 by the suction of blowers, not shown, which may be connected to outlet pipe 10, to super-atmospheric pressures, where the gas is fed to inlet pipe 9 from the discharge of compressors or blowers. Similarly, the gas to be treated may enter at a wide variety of temperatures and may be treated to produce a gas of any desired final temperature and any desired dew-point, depending upon the temperature, concentration and relative volume of dehydrating solution employed.

Various modifications and alterations may be made in the method steps of this invention and in the details and arrangements of the parts of the apparatus illustrated herein, without departing from the scope of the appended claims.

What I claim and desire to secure by Letters Patent is:

1. In the multi-stage process of dehydrating air wherein the air is intimately contacted in the earlier stages with relatively dilute solutions of triethylene glycol and in a final stage with only a relatively concentrated solution of the same material, the improvements which comprise, advancing all of said concentrated solution after use to said earlier stage and commingling it with said relatively dilute solution entering said earlier stages, withdrawing the commingled solution from said earlier stages, reconcentrating a minor portion thereof at a rate sufficient to continuously remove absorbed moisture from the system, cooling the reconcentrated portion and recycling it to said final stage, and cooling the remaining major portion of said commingled solution and recycling it only to said earlier stages.

2. Apparatus for dehydrating gas comprising, a vertically arranged treating tower, a partition dividing the tower into upper and lower sections, means for introducing gas into said lower section, means for withdrawing gas from said upper section, a plurality of vapor-liquid contact devices mounted in each of said sections, a duct providing communication between the lower and upper sections for the passage of gas therethrough, conduits for introducing treating liquids into the upper portions of each of the sections, a pipe for carrying treating liquids from said upper section into the upper portion of said lower section, a pipe for withdrawing liquid from said lower section, first and second branch pipes connected to said last mentioned pipe, said first branch pipe connecting into the one of said conduits which introduces treating liquid into the said lower section, cooling means interposed in said first branch pipe, means for reconcentrating the treating liquid connected to said second branch pipe, means for conveying reconcentrated liquid from said reconcentrating means to the one of said conduits which introduces treating liquid into said upper portion of said upper section, and means for cooling said reconcentrated liquid prior to its entry into said upper section.

3. The multi-stage process of dehydrating gas which comprises, contacting the gas in a plurality of successive stages with a liquid dehydrating agent of progressively increasing concentration, introducing relatively dilute solutions of said agent in each of the stages except the final one, introducing a relatively concentrated solution of said agent into said final stage, advancing all of said concentrated solution after use from said final stage to said earlier stages, withdrawing used solution from each of said earlier stages, cooling the withdrawn solutions and re-circulating the same to said earlier stages, diverting a minor portion of the used dilute solution from the earliest one of said stages, concentrating said minor portion to produce said relatively concentrated solution, and cooling and introducing the same to said final stage.

4. In the multi-stage process of dehydrating air wherein the air is intimately contacted successively in earlier and intermediate stages with relatively dilute solutions of tri-ethylene glycol and in a final stage only with a relatively concentrated solution of the same material, the improvements which comprise, advancing all of said concentrated solution after use from said final stage to said intermediate stages, advancing the solution from said intermediate stages to said earlier stages, cooling the solution in passage through said intermediate stages, withdrawing the used solution from said earlier stages, continuously diverting and concentrating a minor portion of said used solution at a rate sufficient to remove absorbed moisture from the system, cooling the concentrated minor portion and recycling the same to said final stage, and cooling the remainder of said used solution and recycling it to said earlier stages.

5. Apparatus for dehydrating gas comprising, a vertically arranged treating tower, partitions dividing the tower into upper, intermediate and lower sections, means for introducing gas into said lower section, means for withdrawing gas from said upper section, a plurality of vapor-liquid contact devices mounted in each of said sections, ducts in said partitions providing gas passages from one section to the next, conduits for introducing treating liquids into each of said sections, discharge means for discharging treating liquids from said upper section into said intermediate section, cooling means interposed in said discharge means, a pipe for conveying treating liquid from said intermediate section to the one of said conduits leading to said lower section, a pipe for withdrawing treating liquid from said lower section, first and second branch pipes connected to said last-mentioned pipe, said first branch pipe connecting into the one of said conduits which introduces treating liquid into the said lower section, cooling means interposed in said first branch pipe, means for reconcentrating the treating liquid connected to said second branch pipe, means for conveying reconcentrated liquid from said reconcentrating means to the one of said conduits which introduces treating liquid into said upper section, and means for cooling said reconcentrated liquid prior to its entry into said upper section.

6. A process according to claim 3 wherein said minor portion is less than about twenty percent of the total admixed solution withdrawn from said first stage.

7. A process according to claim 3 wherein the dehydrating agent is a substance of the class tri-ethylene glycol, di-ethylene glycol, glycerine.

HENRY ARTHUR MARTIN.